Sept. 11, 1973    J. C. HARDY    3,758,356
METHOD OF BONDING FLEXIBLE PLASTIC TUBES TO FABRICS
Filed Feb. 11, 1971    3 Sheets-Sheet 1
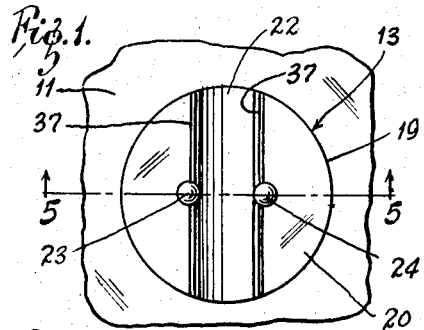
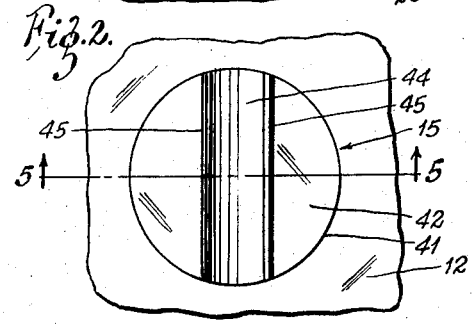
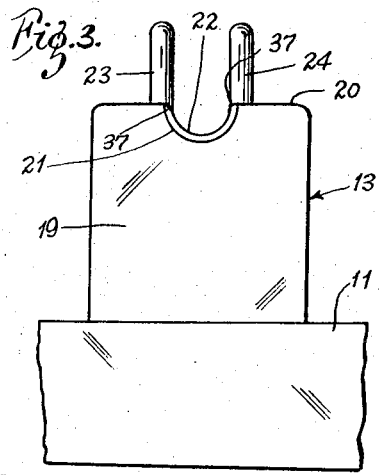
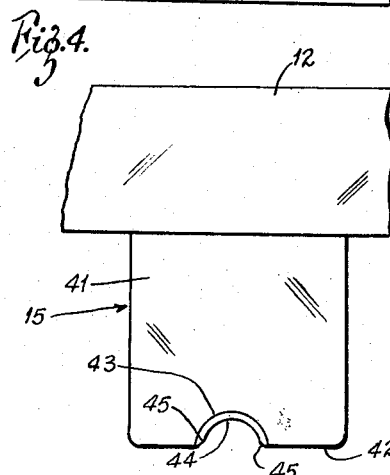
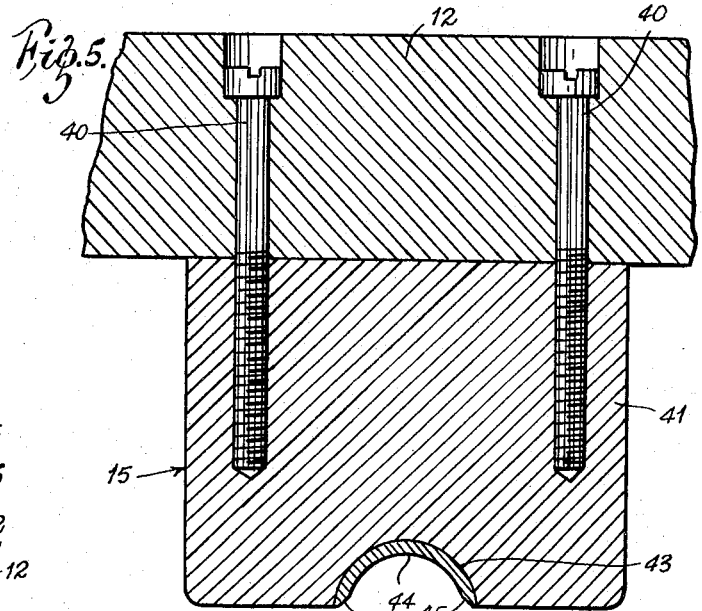
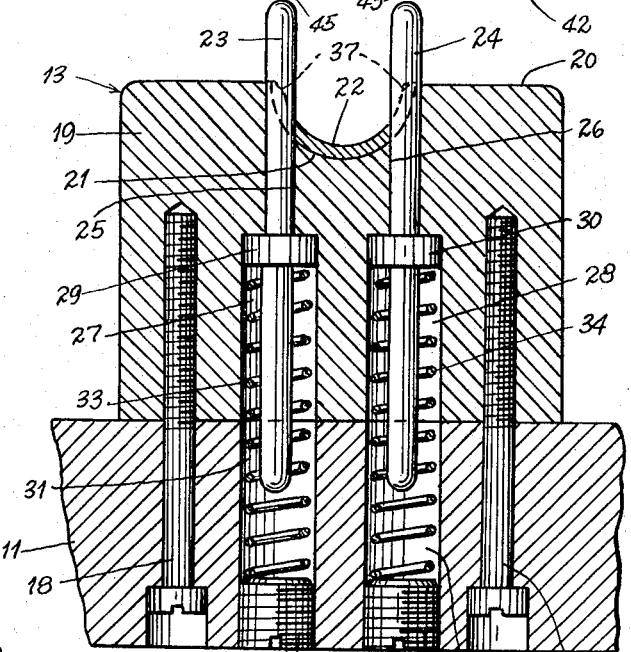
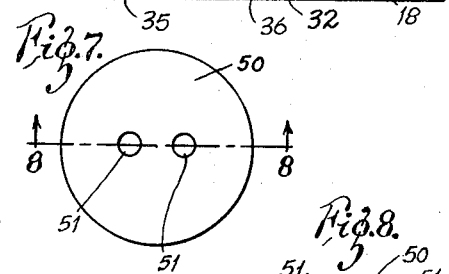
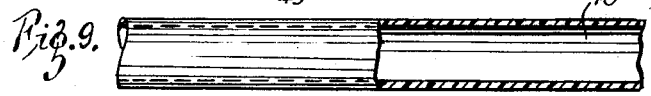
INVENTOR:
JOHN C. HARDY,
BY Rogers, Ezell, Eilers & Robbins
ATTORNEYS

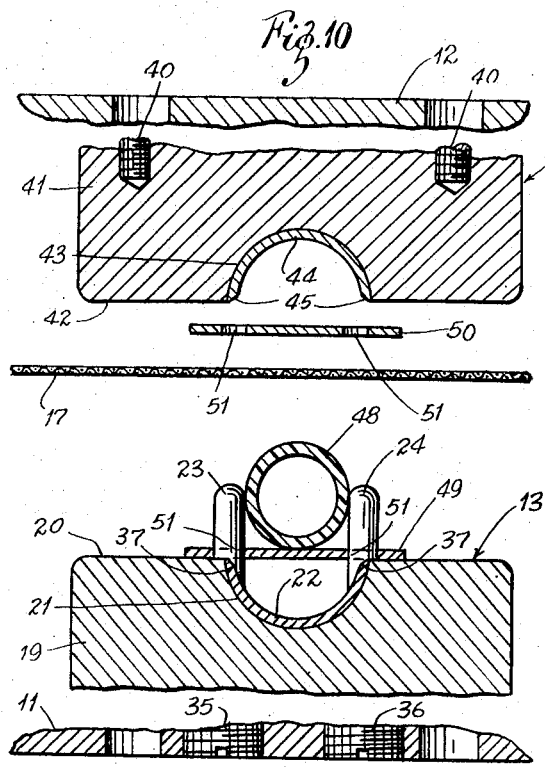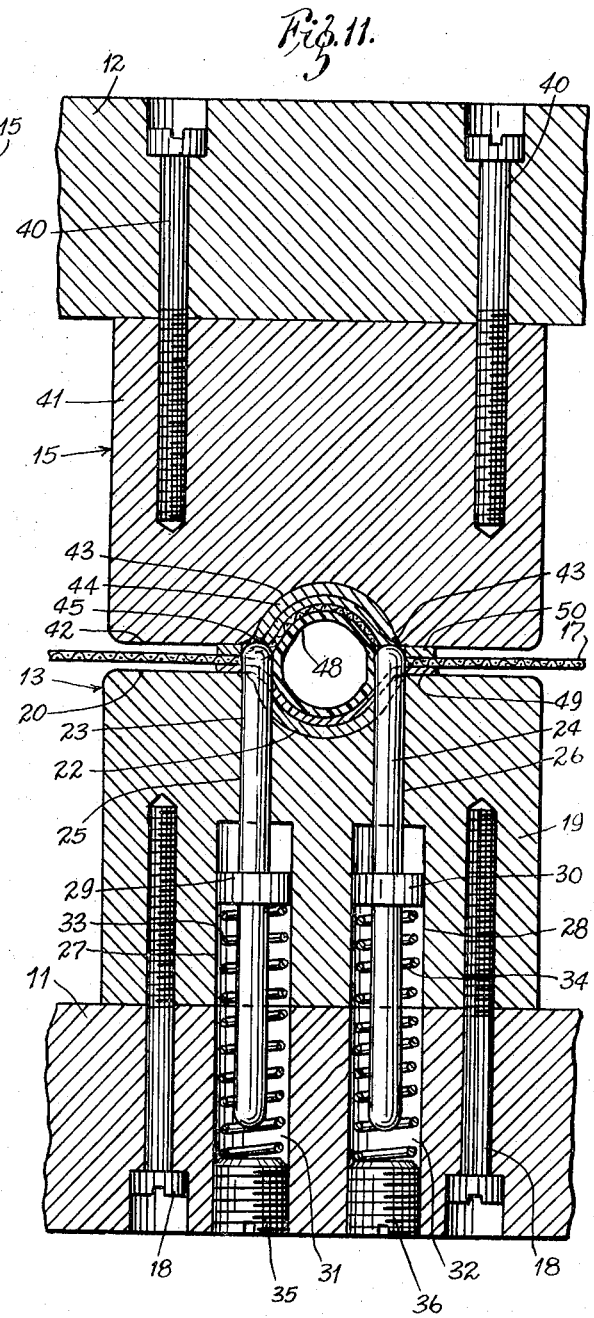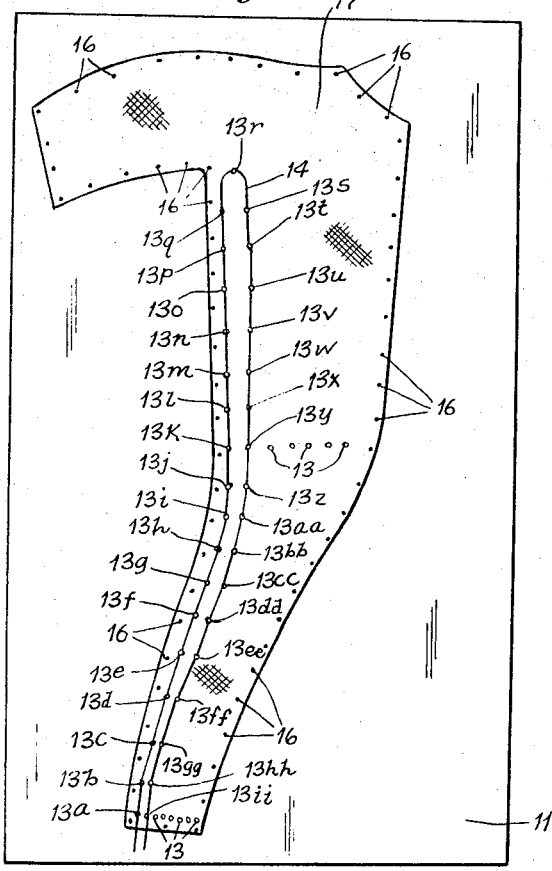

Sept. 11, 1973   J. C. HARDY   3,758,356
METHOD OF BONDING FLEXIBLE PLASTIC TUBES TO FABRICS
Filed Feb. 11, 1971   3 Sheets-Sheet 3
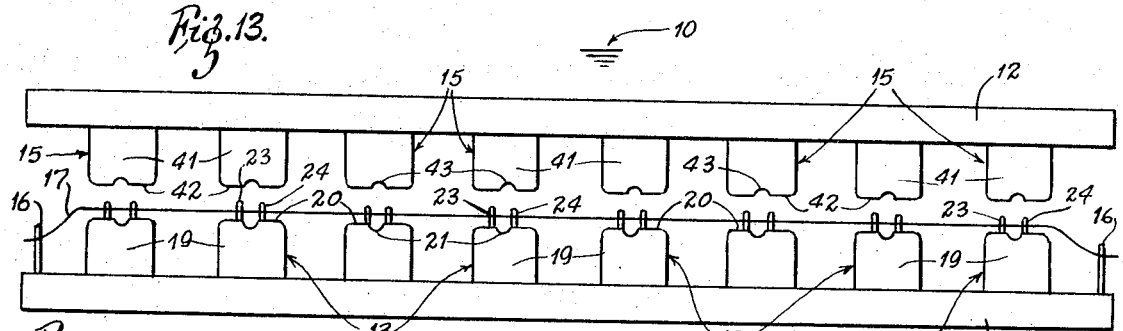
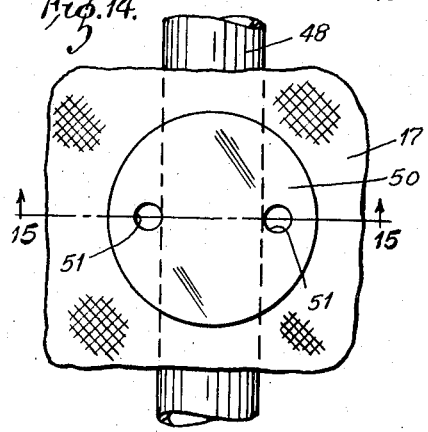
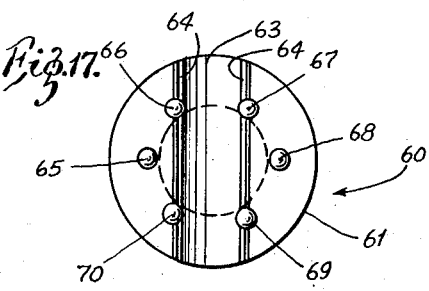
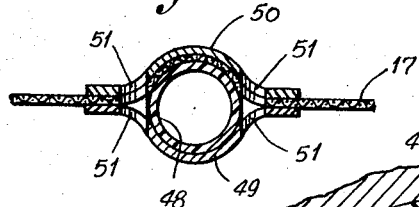
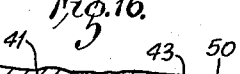
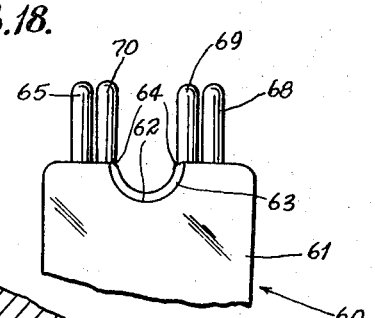
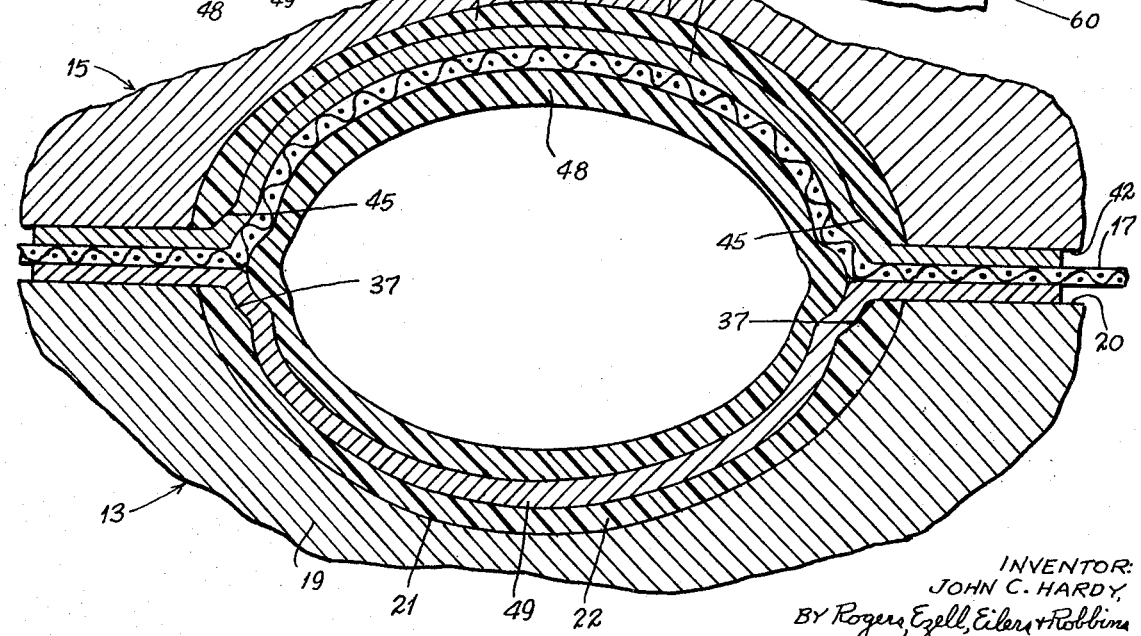
INVENTOR:
JOHN C. HARDY
BY Rogers, Ezell, Eilers & Robbins
ATTORNEYS United States Patent Office 3,758,356
Patented Sept. 11, 1973

3,758,356
METHOD OF BONDING FLEXIBLE PLASTIC TUBES TO FABRICS
John C. Hardy, Weatogue, Conn., assignor to Angelica Corporation, St. Louis, Mo.
Filed Feb. 11, 1971, Ser. No. 114,599
Int. Cl. B29c 17/07, 27/00; B32b 3/20
U.S. Cl. 156—160                         5 Claims

ABSTRACT OF THE DISCLOSURE

Flexible plastic tubing is bonded to open-mesh stretch fabric between heat-sealed plastic discs. Blocks on a fixed lower plate and blocks on a movable upper plate of a heat and pressure bonding machine have grooves between retractable pins for receiving the tubing. Retractable pins project upwardly from the blocks on opposite sides of the grooves in the bottom blocks and receive the two plastic discs with the fabric and the tubing positioned between the discs. The upper plate of the machine applies pressure and heat to cause the plastic discs to extrude together through the pores of the fabric to produce the bond.

BRIEF DESCRIPTION OF THE INVENTION

This invention provides a method for quickly and inexpensively bonding plastic tubing to garment panels. Conventional attachment methods incorporate stitching which is time consuming and expensive and produces a weaker connection of the tubing to the fabric. Also, several stitching points can come loose if a single stitching point is severed and in stitching there is a danger of tubing puncture. During laundering, a garment having tubing stitched to it can become distorted because of the relative motion between the tube and the fabric, sometimes resulting in kinking of the tubes.

In this invention, the plurality of block assemblies are arranged on the lower fixed plate and on the upper movable plate of a pressure and heat sealing machine, such as a Thermatron machine. Pre-stretch pins project upwardly from the fixed plate in a pattern that follows the border outline of a garment panel so that the garment panel, which is of stretch material, can be pre-stretched to the (as-worn) size and shape and hooked onto the pins. The fixed plate is marked with lines that designate the locations of pieces of tubing that are to be bonded to the fabric panels. The block assemblies are positioned in spaced relation along these drawn guidelines on the upper movable and lower fixed plates. Each block assembly has a longitudinal groove in its sealing surface aligned with a guide line into which approximately half of the tube fits. Each lower block assembly also has a pair of retractable spring biased pins on opposite sides of the groove.

For each bonding point, there are two plastic discs. Each disc has two holes in it spaced closer together than the spacing between the pins. In the process, the discs are stretched so that their holes are aligned with the pins, and the lower discs are mounted on the pins and pressed downwardly against the upper surfaces of the lower blocks. Next the tubing is laid in the longitudinal grooves along a guideline. The fabric panel is hooked onto the pre-stretch pins so that it overlies all the lower block assemblies. The upper discs are pushed downwardly against the fabric. Now, when the upper matching blocks on the movable plate of the pressure and heat sealing machine are brought downwardly, depressing the retractable pins, heat and pressure applied to the plastic discs cause them to extrude through the fabric and bond together.

In a modification, each lower block has six circumferentially arranged, spring-biased pins to locate the plastic discs. The plastic discs are simply dropped into the central area that is surrounded by the six pins.

BRIEF DESCRIPTION OF THE DRAWINGS

FIG. 1 is a top plan view of a lower block assembly with fragmentary view of the fixed plate of a heat and pressure sealing machine;

FIG. 2 is a bottom plan view of an upper block assembly with fragmentary view of the movable plate of the heat and pressure sealing machine;

FIG. 3 is a side elevation view of the lower block assembly and fixed plate;

FIG. 4 is a side elevation view of the upper block assembly and movable plate;

FIG. 5 is an enlarged composite view in section of both the upper and lower blocks along the lines 5—5 of FIGS. 1 and 2, with the retractable pins extended;

FIG. 6 is a plan view of an upper plastic disc;

FIG. 7 is a plan view of a lower plastic disc;

FIG. 8 is a view in section along the line 8—8 of FIG. 7 with the disc shaped as if mounted on a block assembly;

FIG. 9 is a broken and partially sectioned view of a tubing section;

FIG. 10 is an exploded partially fragmentary and sectional view prior to assembly of the tubing, discs, and fabric on a block assembly;

FIG. 11 is a view in section similar to that of FIG. 5, but with the retractable pins depressed by the upper plate of the heat and pressure sealing machine;

FIG. 12 is a plan view of the fixed plate of the heat and pressure sealing machine showing a typical fabric panel mounted on pre-stretch pins and showing a typical guideline with block assemblies arranged along the guideline;

FIG. 13 is an end elevation view of the fixed and movable plates of the heat and pressure sealing machine with block assemblies installed;

FIG. 14 is a fragmentary plan view of a typical finished bond of tubing to fabric;

FIG. 15 is a view in section along the line 15—15 of FIG. 14;

FIG. 16 is an enlarged fragmentary elevation view in section through the central portion of the upper and lower blocks brought together for sealing a tube to fabric and particularly illustrating the temporary radial collapsing of the tube in a modified form of the grooves, wherein they are oval rather than circular in cross-section;

FIG. 17 is a top plan view of a modified lower block assembly;

FIG. 18 is a fragmentary side elevation view of the block assembly of FIG. 17.

DETAILED DESCRIPTION OF THE INVENTION

This method uses a conventional heat and pressure sealing machine 10 (see FIG. 13) of the kind having a stationary lower plate 11 and a movable upper plate 12. The upper plate is driven downwardly under a pneumatic pressure, and heat is applied by establishing an electric field between the plates 11 and 12 with the plates 11 and 12 charged to opposite polarities. The machines 10 are commercially available, an example being one sold under the trademark Thermatron.

For this invention, a plurality of block assemblies 13 is mounted on the fixed plate 11 of the machine 10 (see FIG. 12). The block assemblies 13 are arranged on the plate 11 so that they extend at about 3" intervals along lines drawn on the plate 11, along which tubes are to be laid as will be described. For illustration, FIG. 12 shows one such line 14 drawn on the plate 11 and blocks 13a through 13ii arranged along the line 14. These blocks 13a–13ii along the line 14 are in the position of two passes of a tube that is to be laid over the blocks 13a through 13ii. Additional block assemblies 13 are also arranged on the plate 11 along similarly drawn lines for additional tubes that are to be bonded to a fabric panel. Only a few of these additional block assemblies 13 are shown in FIG. 12.

A plurality of block assemblies 15 is mounted on the movable plate 12 of the machine 10 (see FIG. 11) and are arranged on the plate 12 to align with the block assemblies 13 on the plate 11.

A plurality of pre-stretch pins 16 is mounted on the fixed plate 11. The pre-stretch pins 16 are arranged in a border outline corresponding with the somewhat stretched shape of a panel 17 of fabric that, when mounted on the pins 16, is stretched to approximately the shape it would assume when worn as part of a garment. The fabric panel 17 is loose-mesh stretch cloth, such as spandex cloth.

As shown in FIG. 5, each block assembly 13 is fastened to the plate 11 by a pair of countersunk bolts 18. Each block assembly 13 comprises a block 19 of electrically conductive material having a top wall 20 interrupted by a longitudinal groove 21. Each block 19 is about ¾ inch in diameter. An insulator lining 22 lines the base and sides of the groove 21 to block transmission of the electrical field carried by the block 19 past the area occupied by the insulator lining 22.

A pair of retractable pins 23 and 24 of insulating material project through bores 25 and 26 in the block 19. The bores 25 and 26 have countersunk bores 27 and 28 for slideably receiving enlarged shoulders 29 and 30 on the pins 23 and 24 that act as stops limiting the upward movement of the pins 23 and 24. The plate 11 has bores 31 and 32 aligned with the countersunk bores 27 and 28 in which a pair of compression springs 33 and 34 are mounted. The compression springs 33 and 34 are compressed by bearing against the shoulders 29 and 30 on the pins 23 and 24 and against two lower blocks 35 and 36 threaded into the lower ends of the bores 31 and 32 in the plate 11. The insulator lining 22 has 45° chamfers 37 at its upper, inner edges.

As shown in FIG. 5, each block assembly 15 is fastened to the plate 12 by a pair of countersunk bolts 40. Each block assembly 15 comprises a block 41 of electrically conductive material having an exposed sealing face 42 interrupted by a longitudinal groove 43. Each block 41 is about ¾" in diameter. An insulator lining 44 lines the base and sides of the groove 43 to block transmission of the electrical field carried by the block 41 past the area occupied by the insulator lining 44. There are 45° chamfers 45 at the lower inner edges of the insulator lining, as FIG. 5 shows. The grooves 21 and 43 may be circular in cross-section, but preferably are oval as illustrated in FIG. 16 for reasons hereinafter explained.

FIGS. 14 and 15 illustrate a typical junctive point of tube to fabric produced by the process steps to be described hereinafter. A typical liquid conveying, flexible plastic tube 48 which is about ⅛ to ⁵⁄₃₂ inch O.D., is fastened to what will become the inner surface of the panel 17 between two plastic discs 49 and 50. The fabric panel 17 is also between the discs 49 and 50, and the discs 49 and 50 are heat sealed together. Each disc 49 and 50 has spaced holes 51 through it.

For the process of this invention, the block assemblies 13 and 15 are mounted on the plates 11 and 12 in the patterns that correspond to the locations that the tubes 48 are to occupy on the garment panel 17. The pre-stretch pins 16 are mounted on the plate 11 in locations that outline the border of the garment panel 17 when the garment panel 17 is pre-stretched. The garment panel 17 is cut to shape and, if more than one part is to comprise the panel 17, the parts are sewed together. The panel 17 illustrated is for one of two front panels of a garment, the panels 17 including portions for the torso, the right leg, and the right arm. Lines, such as the lines 14, are drawn on the plate 11 to identify the paths of the tubes 48 before the blocks 13 are mounted in place.

The discs 49 and 50 are formed and the holes 51 cut in them. The discs 49 and 50 are ½ to ⅝ inch in diameter. The holes 51 are spaced closer together than the spacing between the pins 23 and 24. The tubes 48 are cut to the proper length.

On each block assembly 13, a disc 49 is mounted by stretching it so that its holes 51 fit over the pins 23 and 24. The disc 49 is pushed downwardly against the upper face 20 of the block 19 and stretched across the groove 21. When all the discs 49 are in place, the tubes 48 are laid along the patterns defined by the lines 14 on the plate 11. Each tube 48 lies in the groove 21 of each block 19 that is mounted along a line 14 and in that position, presses the plastic discs 49 into the grooves 21 and into contact with the insulating linings 22. The tubes 48 rest against the discs 49 and rest between the pins 23 and 24. The pins 23 and 24 apply a slight compressive force to the sides of the tubes 48 to hold them in place.

Next the spandex cloth panel 17 is laid over the block assemblies 13 and its peripheral edges are stretched over the pre-stretch pins 16. This stretches the fabric of the panel 17 to about the shape it would have when worn as part of a garment. The inner areas of the panel 17 are pressed down against the upper surfaces 20 of the blocks 19 with the pins 23 and 24 of the block assemblies 13 protruding through the cloth of the panel 17 (see FIG. 13).

Next the upper plastic sealing discs 50 are spread apart to align their holes 51 with the pins 23 and 24, and these plastic discs 50 are pressed downwardly against the fabric panel 17. Then the upper plate 12 of the heat sealing machine 10 and the upper sealing block assemblies 15 are brought downwardly under pneumatic pressure against the block assemblies 13, at which time the pins 23 and 24 yield under the pressure of the springs 33 and 34 so that the blocks 41 are pressed against the plastic discs 50, applying heat and pressure, resulting in extrusion of the plastic of the discs 49 and 50 through the pores of the fabric panel 17 and sealing the discs together. Because of the insulator linings 22 and 44, and because the pins 23 and 24 are of insulating material, no heat is applied to the areas of the plastic discs 49 and 50 lying against the tubes 48 between the pins 23 and 24.

As shown in the modification of FIG. 16, when the blocks 19 and 41 are brought together, the grooves 21 and 43 are oval, rather than circular, in cross-section. This temporarily distorts the tube 48 from its normal round shape to an oval shape. As pneumatic pressure is applied to the block assemblies 13 and 15, excess material of the tubing 48 is allowed to bulge into the area between the chamfered grooves 37 and 45, thereby precluding pinching of the tube sidewalls between the blocks 13 and 15 and allowing the tube to expand unmarked to its original size and cross-sectional shape when the pressure is released. This bulging of material and temporary radial compression of the tubing is desirable because when the pressure is released and the tubing expands to its original shape, it produces additional tension on the discs 49 and 50 to hold the tube 48 firmly to the fabric 17.

After the upper plate 12 and upper sealing block assemblies 15 are retracted, the garment can be peeled from the pins 16 and the block assemblies 13. The panel 17 can be sewed to similar and complimentary panels to complete a hypothermia garment of the kind described and illustrated in the co-pending application of the same inventor assigned to the same assignee as the present application, such co-pending application having been filed Feb. 11, 1971 and bearing Ser. No. 114,607 and having the title Patient Garment with Temperature Control. The results is a garment that has tubes bonded to its for conveying temperature-controlled liquid or other fluids.

FIGS. 17 and 18 illustrate a modification wherein each lower block assembly 60 has a block 61 that is identical to the block 19 with an identical longitudinal groove 62 having an insulator lining 63 with chamfered upper, inner edges 64. However, instead of the two pins 23 and 24, there are six peripheral pins 65, 66, 67, 68, 69 and 70, each biased by a compression spring loading mechanism identical to that shown in FIG. 3 for the pins 23 and 24. The six pins 65–70 are located so that the discs 49 and 50 can be dropped into the area within the pins, the 65-70 thus locating the discs, as shown in dotted lines in FIG. 17. The pins 69 and 70 and the pins 66 and 67 apply a slight compressive force to a tube lying in the groove 62. The arrangement of FIGS. 17 and 18 is easier to assemble since the discs 49 and 50 do not have to be fitted over the pins 23 and 24, but are merely dropped into the area defined by the pins 65–70. Otherwise, the assembly steps to join the tubes to the fabric are as has been described.

The bonding method of this invention is faster and less expensive than the conventional sewing techniques. The resulting bond is wash and sterization resistant. It is highly tear resistant because the edges of the discs are sealed together, the discs having been specifically located by the pins 23 and 24, or by the pins 65–70. Since the bonds are independent of one another, even if one bond joint fails, the remaining bonds hold intact, so the structural integrity of the garment is maintained.

Various changes and modifications may be made within this invention as will be readily apparent to those skilled in the art. Such changes and modifications are within the scope and teaching of this invention as defined by the claims appended hereto.

What is claimed is:

1. A method of attaching a tube to fabric, which has pores therein that are permeable to heated and pressurized thermoplastic material, comprising the steps of disposing one surface of said tube immediately adjacent one surface of said fabric, disposing a thermoplastic disc immediately adjacent the opposite surface of said tube so one portion of said thermoplastic disc extends laterally outwardly beyond one side of said tube and confronts a portion of said one surface of said fabric which is spaced laterally outwardly beyond said one side of said tube and so the opposite portion of said thermoplastic disc extends laterally outwardly beyond the opposite side of said tube and confronts a second portion of said one surface of said fabric which is spaced laterally outwardly beyond said opposite side of said tube, disposing a second thermoplastic disc immediately adjacent the opposite surface of said fabric so at least a portion of said second thermoplastic disc is coextensive with at least a part of said one portion of the first said thermoplastic disc and so at least a second portion of said second thermoplastic disc is coextensive with at least a part of said opposite portion of the first said thermoplastic disc, thereby locating said fabric and said tube between said two thermoplastic discs, and applying sufficient heat and pressure to said two thermoplastic discs to cause some of the material of said two thermoplastic discs to extrude through the pores of said fabric and to bond said two thermoplastic discs to one another with the central portion of the first said thermoplastic disc tightly encasing one part of the external surface of a given length of said tube and with said fabric tightly encasing the other part of said external surface of said given length of said tube.

2. The method of claim 1 wherein during the step of applying heat and pressure to said two thermoplastic discs, essentially all of the heat which is applied to said two thermoplastic discs is applied to said one portion of said first said thermoplastic disc, to said opposite portion of said first said thermoplastic disc, to the first said portion of said second thermoplastic disc, and to said second portion of said second thermoplastic disc, whereby only very little of said heat which is applied to said two thermoplastic discs is applied to those portions of said two thermoplastic discs that are in register with said tube, thereby effectively freeing said tube and the areas of said two thermoplastic discs which are immediately adjacent said tube from said applied heat.

3. A method of attaching a tube to fabric, which has pores therein that are permeable to heated and pressurized thermoplastic material, comprising the steps of stretching two thermoplastic discs, locating said fabric and said tube between said two stretched thermoplastic discs, and thereafter applying sufficient heat and pressure to said two thermoplastic discs to cause some of the material of said two thermoplastic discs to extrude through the pores of said fabric and to bond said two thermoplastic discs to one another, the stretching of said two thermoplastic discs prior to the application of said heat and pressure enabling said two thermoplastic discs after the completion of said heat and pressure application step to contract to firmly hold said tube against said fabric.

4. The method of claim 1 including the step of temporarily radially compressing said tube under pressure in a controlled manner while avoiding melting of the material of said tube, the subsequent release of the radial compressing pressure causing said two thermoplastic discs to remain in tension around said tube and hold said tube securely to said fabric.

5. The method of claim 1 wherein said fabric is a panel, and wherein a plurality of tubes are connected to said panel by locating each of said tubes and the fabric adjacent it between a pair of thermoplastic discs and simultaneously applying heat and pressure to all of said thermoplastic discs.

References Cited
UNITED STATES PATENTS

| | | | |
|---|---|---|---|
| 1,226,481 | 5/1917 | Donnenwirth | 264—257 |
| 2,397,743 | 4/1946 | Kaphan | 264—257 X |
| 3,234,309 | 2/1966 | Graff | 264—257 X |
| 2,957,792 | 10/1960 | Magid | 2—274 X |
| 2,768,107 | 10/1956 | Magid | 2—274 X |
| 1,905,685 | 4/1933 | Safir et al. | 2—274 X |
| 2,536,182 | 1/1951 | Humphrey | 156—213 X |
| 2,838,436 | 6/1958 | Clingman | 156—212 X |

PHILIP DIER, Primary Examiner

U.S. Cl. X.R.

2—274; 128—402; 156—198, 713, 581; 264—93, 257